(12) United States Patent
Xie et al.

(10) Patent No.: US 12,185,040 B2
(45) Date of Patent: Dec. 31, 2024

(54) CLOUD-BASED VIRTUAL STORAGE APPLIANCE MONITORING SYSTEM AND METHOD

(71) Applicant: Dell Products, L.P., Round Rock, TX (US)

(72) Inventors: Denglu Xie, Shanghai (CN); Dmitry Krivenok, St. Petersburg (RU)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/177,905

(22) Filed: Mar. 3, 2023

(65) Prior Publication Data

US 2024/0214711 A1   Jun. 27, 2024

(30) Foreign Application Priority Data

Dec. 27, 2022 (CN) .......................... 202211688352.1

(51) Int. Cl.
H04Q 9/00 (2006.01)
H04L 9/40 (2022.01)
H04L 67/06 (2022.01)

(52) U.S. Cl.
CPC ........... *H04Q 9/00* (2013.01); *H04L 63/1425* (2013.01); *H04L 67/06* (2013.01)

(58) Field of Classification Search
CPC ........ H04Q 9/00; H04L 63/1425; H04L 67/06
See application file for complete search history.

(56) References Cited

U.S. PATENT DOCUMENTS

| | | | |
|---|---|---|---|
| 8,924,658 B1* | 12/2014 | Bairavasundaram | G06F 3/0653 711/E12.001 |
| 2014/0187890 A1* | 7/2014 | Mensinger | A61B 5/742 600/365 |
| 2018/0253637 A1* | 9/2018 | Zhu | H04L 67/535 |
| 2018/0262407 A1* | 9/2018 | Biswas | H04L 43/12 |
| 2018/0335956 A1* | 11/2018 | Iyer | G06F 3/067 |
| 2019/0056966 A1* | 2/2019 | Baboval | G06F 3/067 |
| 2019/0318039 A1* | 10/2019 | Nozhchev | G06F 16/256 |
| 2021/0089336 A1* | 3/2021 | Jaini | G06F 8/36 |
| 2023/0273740 A1* | 8/2023 | Hironaka | G06F 3/0641 707/640 |
| 2023/0333956 A1* | 10/2023 | Kommula | G06F 11/3409 |

OTHER PUBLICATIONS

Wikipedia, "Managed file transfer", Dec. 11, 2022. (Year: 2012).*

* cited by examiner

*Primary Examiner* — Brian J. Gillis
*Assistant Examiner* — Chhian (Amy) Ling
(74) *Attorney, Agent, or Firm* — Brian J. Colandreo; Heath M. Sargeant; Holland & Knight LLP

(57) ABSTRACT

A method, computer program product, and computing system for transferring telemetry data from a virtual storage appliance deployed within a cloud computing environment to a cloud-based object storage device within the cloud computing environment. Storage location information associated with the telemetry data within the cloud-based object storage device may be provided to a remote secure monitoring system. The telemetry data may be provided from the cloud-based object storage device to the remote secure monitoring system.

18 Claims, 4 Drawing Sheets

CLOUD-BASED VIRTUAL STORAGE APPLIANCE MONITORING SYSTEM AND METHOD

RELATED APPLICATION(S)

This application claims priority from Chinese Patent Application No. 202211688352.1, filed on 27 Dec. 2022 at the State Intellectual Property Office, titled "Cloud-based Virtual Storage Appliance Monitoring System and Method", the entire contents of which is incorporated herein by reference.

BACKGROUND

Storing and safeguarding electronic content may be beneficial in modern business and elsewhere. Accordingly, various methodologies may be employed to protect and distribute such electronic content.

Storage of electronic content may be deployed in a cloud computing environment. A cloud computing environment is a technological environment that provides cloud-based computing services over a set of hosted servers and applications which are accessible over the internet or other network configuration. Examples of cloud-based computing services include applications and development platforms, to servers, storage, and virtual computing systems. Cloud-based computing services are provided by cloud computing providers (service providers) as a service over the internet. Their services include, servers, virtual machines, applications, application development platforms, storage, databases, and/or networking. Users (individuals or companies) can subscribe to cloud computing services with varying pricing options to choose from.

When processing telemetry data associated with a cloud computing environment, conventional approaches store the telemetry data on "backend" volumes of the cloud computing environment. These volumes are not cost efficient, and cannot granularly change the size once a virtual system is deployed within the cloud computing environment. Furthermore, existing approaches to access the data from the cloud computing environment on other systems includes processing expensive IO operations directly from the volumes of the cloud computing environment. This process is expensive from an egress cost perspective and is relatively slow.

SUMMARY OF DISCLOSURE

In one example implementation, a computer-implemented method executed on a computing device may include, but is not limited to, transferring telemetry data from a virtual storage appliance deployed within a cloud computing environment to a cloud-based object storage device within the cloud computing environment. Storage location information associated with the telemetry data within the cloud-based object storage device may be provided to a remote secure monitoring system. The telemetry data may be provided from the cloud-based object storage device to the remote secure monitoring system.

One or more of the following example features may be included. The telemetry data may include at least one of: one or more log files; and one or more archive files. Transferring telemetry data from the virtual storage appliance to the cloud-based object storage device may include generating a configuration file including access information associated with the cloud-based object storage device. Providing the storage location information associated with the telemetry data within the cloud-based object storage device to the remote secure monitoring system may include registering the cloud-based object storage device for communicating with the remote secure monitoring system. Providing the telemetry data from the cloud-based object storage device to the remote secure monitoring system may include: providing a notification to the remote secure monitoring system when telemetry data is transferred to the cloud-based object storage device; processing the storage location information associated with the telemetry data to access the telemetry data stored in the cloud-based object storage device; and downloading the telemetry data from the cloud-based object storage device. Downloading the telemetry data from the cloud-based object storage device may include downloading the telemetry data from the cloud-based object storage device using Managed File Transfer (MFT). The telemetry data may be provided from the remote secure monitoring system to a data analysis system.

In another example implementation, a computer program product resides on a computer readable medium that has a plurality of instructions stored on it. When executed by a processor, the instructions cause the processor to perform operations that may include, but are not limited to, transferring telemetry data from a virtual storage appliance deployed within a cloud computing environment to a cloud-based object storage device within the cloud computing environment. Storage location information associated with the telemetry data within the cloud-based object storage device may be provided to a remote secure monitoring system. The telemetry data may be provided from the cloud-based object storage device to the remote secure monitoring system.

One or more of the following example features may be included. The telemetry data may include at least one of: one or more log files; and one or more archive files. Transferring telemetry data from the virtual storage appliance to the cloud-based object storage device may include generating a configuration file including access information associated with the cloud-based object storage device. Providing the storage location information associated with the telemetry data within the cloud-based object storage device to the remote secure monitoring system may include registering the cloud-based object storage device for communicating with the remote secure monitoring system. Providing the telemetry data from the cloud-based object storage device to the remote secure monitoring system may include: providing a notification to the remote secure monitoring system when telemetry data is transferred to the cloud-based object storage device; processing the storage location information associated with the telemetry data to access the telemetry data stored in the cloud-based object storage device; and downloading the telemetry data from the cloud-based object storage device. Downloading the telemetry data from the cloud-based object storage device may include downloading the telemetry data from the cloud-based object storage device using Managed File Transfer (MFT). The telemetry data may be provided from the remote secure monitoring system to a data analysis system.

In another example implementation, a computing system includes at least one processor and at least one memory architecture coupled with the at least one processor, wherein the at least one processor configured to transfer telemetry data from a virtual storage appliance deployed within a cloud computing environment to a cloud-based object storage device within the cloud computing environment. Storage location information associated with the telemetry data within the cloud-based object storage device may be provided to a remote secure monitoring system. The telemetry data may be provided from the cloud-based object storage device to the remote secure monitoring system.

One or more of the following example features may be included. The telemetry data may include at least one of: one or more log files; and one or more archive files. Transferring telemetry data from the virtual storage appliance to the cloud-based object storage device may include generating a configuration file including access information associated with the cloud-based object storage device. Providing the storage location information associated with the telemetry data within the cloud-based object storage device to the remote secure monitoring system may include registering the cloud-based object storage device for communicating with the remote secure monitoring system. Providing the telemetry data from the cloud-based object storage device to the remote secure monitoring system may include: providing a notification to the remote secure monitoring system when telemetry data is transferred to the cloud-based object storage device; processing the storage location information associated with the telemetry data to access the telemetry data stored in the cloud-based object storage device; and downloading the telemetry data from the cloud-based object storage device. Downloading the telemetry data from the cloud-based object storage device may include downloading the telemetry data from the cloud-based object storage device using Managed File Transfer (MFT). The telemetry data may be provided from the remote secure monitoring system to a data analysis system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
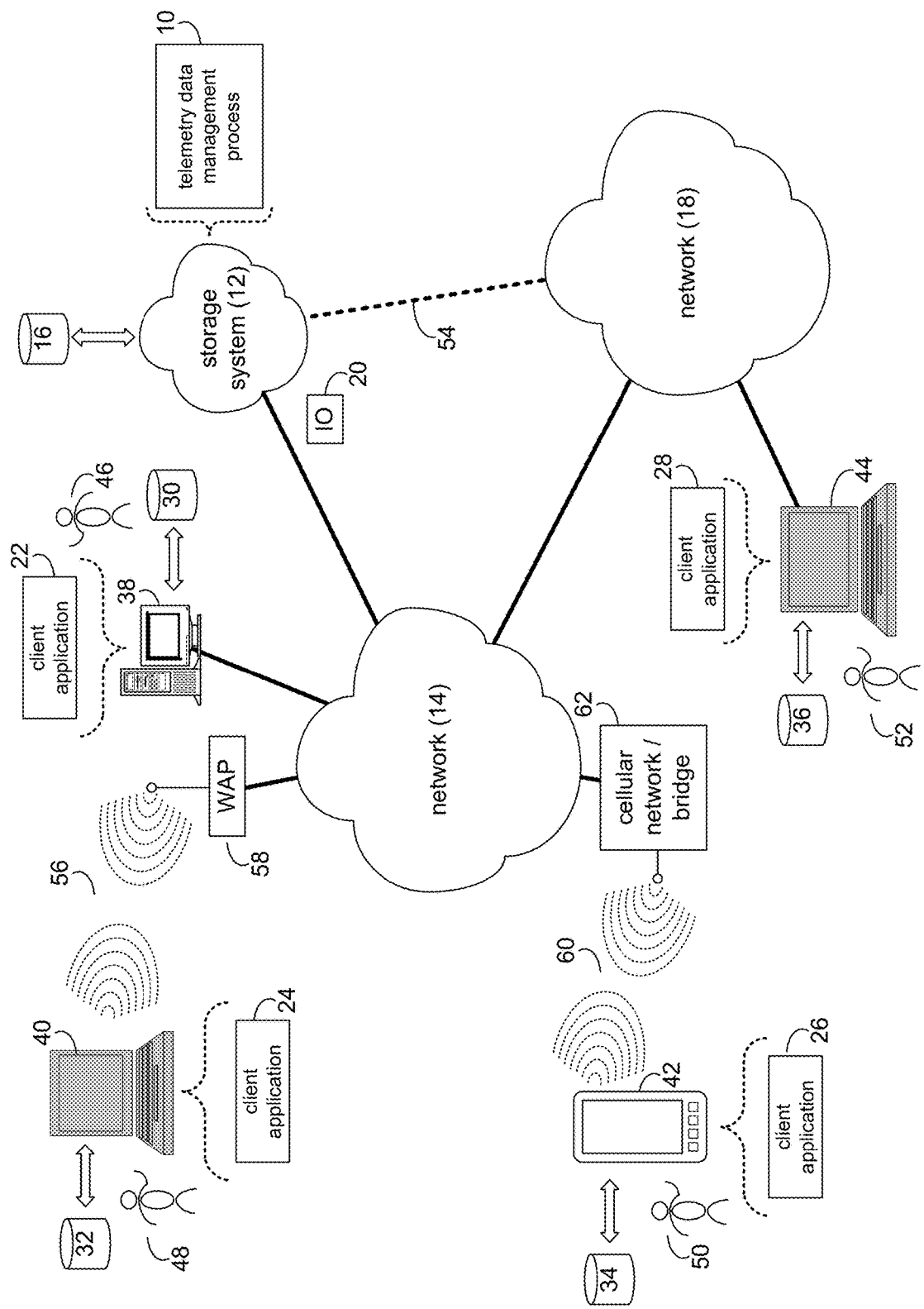
FIG. 1 is an example diagrammatic view of a storage system and a telemetry data management process coupled to a distributed computing network according to one or more example implementations of the disclosure.

Referring to FIG. 1, there is shown telemetry data management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of telemetry data management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of telemetry data management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a telemetry data management process, such as telemetry data management process 10 of FIG. 1, may include but is not limited to, transferring telemetry data from a virtual storage appliance deployed within a cloud computing environment to a cloud-based object storage device within the cloud computing environment. Storage location information associated with the telemetry data within the cloud-based object storage device may be provided to a remote secure monitoring system. The telemetry data may be provided from the cloud-based object storage device to the remote secure monitoring system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
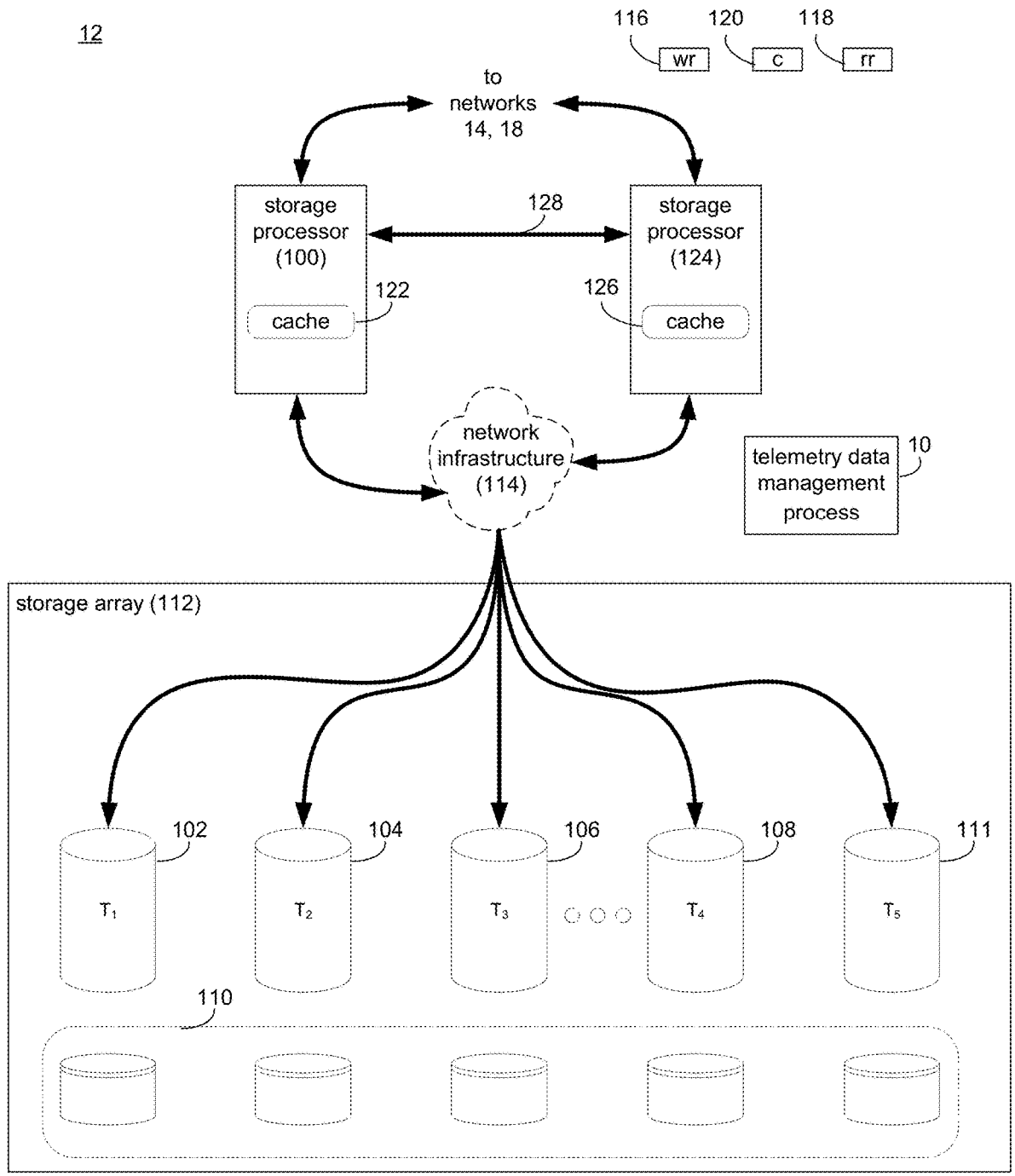
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of telemetry data management process 10. The instruction sets and subroutines of telemetry data management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of telemetry data management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of telemetry data management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of telemetry data management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 126 prior to being stored on e.g. one or more of storage targets 102, 104, 106, 108, 111. Accordingly, during use of data array 112, backend cache memory system 126 may be populated (e.g., warmed) and, therefore, subsequent read requests may be satisfied by backend cache memory system 126 (e.g., if the content requested in the read request is present within backend cache memory system 126), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include backend cache memory system 126. Examples of backend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within backend cache memory system 124. Depending upon the manner in which backend cache memory system 126 is configured, storage processor 124 may immediately write content 118 to data array 112 (if backend cache memory system 126 is configured as a write-through cache) or may subsequently write content 118 to data array 112 (if backend cache memory system 126 is configured as a write-back cache).

In some implementations, the instruction sets and subroutines of telemetry data management process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of telemetry data management process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 126 prior to being stored on e.g. one or more of storage targets 102, 104, 106, 108, 111. Accordingly, during use of data array 112, backend cache memory system 126 may be populated (e.g., warmed) and, therefore, subsequent read requests may be satisfied by backend cache memory system 126 (e.g., if the content requested in the read request is present within backend cache memory system 126), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
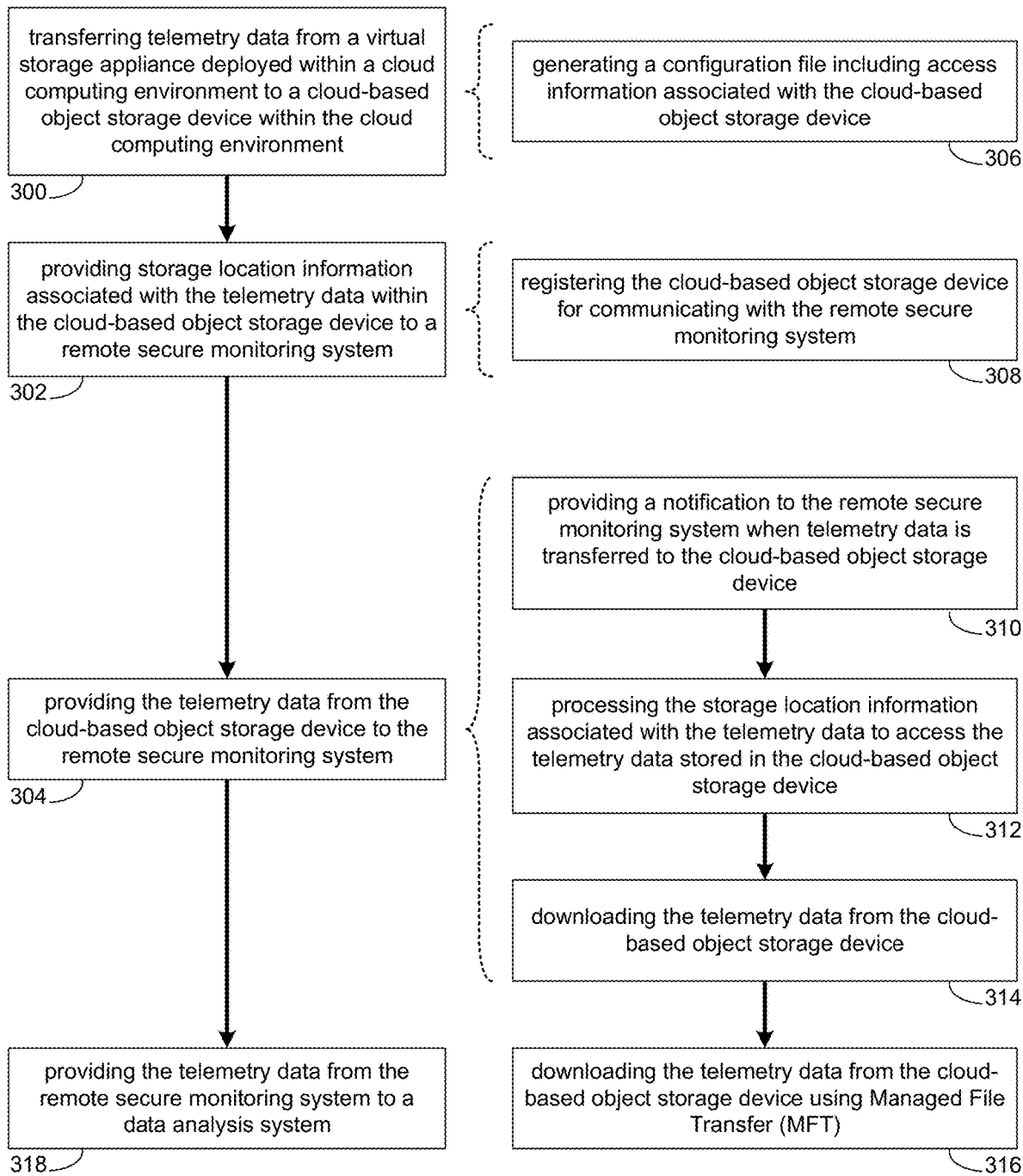
FIG. 3 is an example flowchart of telemetry data management process according to one or more example implementations of the disclosure.
Figure 4:
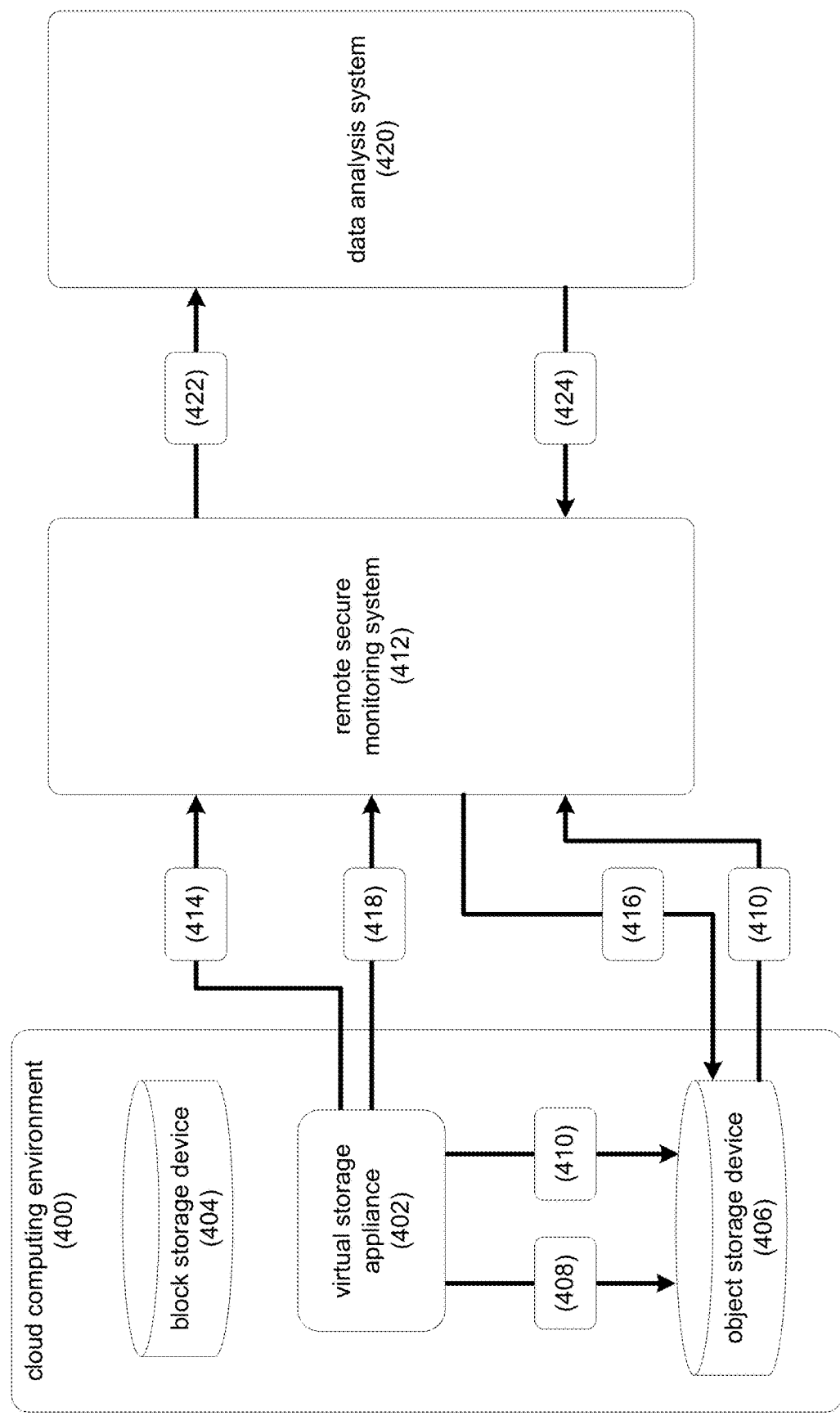
FIG. 4 is an example diagrammatic view of the storage system of FIG. 1 according to one or more example implementations of the disclosure.

The Telemetry Data Management Process:

Referring also to the examples of FIGS. 3-4 and in some implementations, telemetry data management process 10 may transfer 300 telemetry data from a virtual storage appliance deployed within a cloud computing environment to a cloud-based object storage device within the cloud computing environment. Storage location information associated with the telemetry data within the cloud-based object storage device may be provided 302 to a remote secure monitoring system. The telemetry data may be provided 304 from the cloud-based object storage device to the remote secure monitoring system.

As will be discussed in greater detail below, implementations of the present disclosure may allow for more efficient resource utilization for processing of telemetry data generated by a cloud-based virtual storage appliance (VSA). For example, portions of the storage system (e.g., storage system 12) may be deployed in a cloud computing environment. A cloud computing environment is a technological environment that provides cloud-based computing services over a set of hosted servers and applications which are accessible over the internet or other network configuration. Examples of cloud-based computing services include applications and development platforms, to servers, storage, and virtual computing systems. Cloud-based computing services are provided by cloud computing providers (service providers) as a service over the internet. Their services include, servers, virtual machines, applications, application development platforms, storage, databases, and/or networking. Users (individuals or entities) can subscribe to cloud computing services with varying pricing options to choose from. Examples of cloud service providers include, but are not limited to, Microsoft® Azure® from Microsoft Corporation in the United States, Amazon Web Services™ (AWS™) from Amazon.com, Inc., and Google Cloud Platform™ from Google LLC.

Cloud computing environments use virtualization technology, which allows for the creation of simulated virtual computers that behave like physical computers. Such computers are called Virtual Machines (VM). Though multiple VMs can be created on one physical server, VMs typically work as isolated independent machines and their files and other resources are not visible to one other. Virtualization allows more efficient use of hardware resources by running multiple VMs in the same hardware and serving multiple users or user applications at the same time, which helps to reduce the cost of computing.

In some implementations, a virtual storage appliance (VSA) may be deployed in the cloud computing environment. A VSA is a set of virtual machines in the cloud computing environment with storage devices that typically store an operating system, applications, and data. Referring also to FIG. 4 and in some implementations, a cloud computing environment (e.g., cloud computing environment 400) may be configured to perform various cloud-based computing services. In the example of FIG. 4, a VSA (e.g., VSA 402) deployed within a cloud computing environment 400. In one example, VSA 402 is a PowerStore™ virtual storage appliance available from Dell Technologies Inc. However, it will be appreciated that various VSAs may be used within the scope of the present disclosure.

In some implementations, with a cloud-based or cloud-deployed VSA, telemetry data (i.e., support files including log files, archive files, etc. indicative of the operation of a storage system and/or a virtual storage appliance deployed within a cloud computing environment) is generated by the VSA that does not change after creation but is transferred outside of the VSA for remote analysis. This telemetry data is large and may fill up the operating system volume of the VSA. For example, conventional approaches to storing telemetry data includes storing the telemetry data in a cloud-based block storage device. A cloud-based block storage device (e.g., block storage device 404) is a storage device deployed within the cloud computing environment that is configured to store data in equally sized blocks. This system offers performance advantages over traditional storage, and generally boasts lower latency. However, cloud-based block storage device is a premier storage device and is typically the most expensive. In one example, the cloud-based block storage device is Amazon Elastic Block Storage.

Additionally, the transfer of the telemetry data may result in expensive IO operations on VSA nodes and occupy the VSA system resources (e.g., CPU, memory and bandwidth) used for production activities. Accordingly, the movement of telemetry data using the resources of the VSA is inefficient (both in terms of VSA performance and cloud-based operating costs). In some implementations, telemetry data management process 10 stores and transfers telemetry data in a more efficient way by utilizing cloud-based object storage in public cloud resources.

In some implementations, cloud-based object storage is a storage service in public cloud resources that is cost efficient. Cloud-based object storage is well suited for static data, and its agility and flat nature means it can scale to extremely large quantities of data. In some implementations, the cloud-based objects have sufficient information for an application to find the data quickly. Cloud-based object storage also supports HTTP protocol for data transfer and most clients support HTTP. Accordingly, these characteristics of cloud-based object storage help to resolve the issues associated with storing and transferring telemetry data from a cloud-deployed VSA without using expensive conventional approaches (i.e., storing large telemetry data files in expensive block-based storage spaces and using VSA resources to process IO operations with the telemetry data).

In some implementations, telemetry data management process 10 transfers 300 telemetry data from a virtual storage appliance deployed within a cloud computing environment to a cloud-based object storage device within the cloud computing environment. As discussed above, telemetry data generally includes status or support data. In some implementations, the telemetry data includes at least one of one or more log files and one or more archive files. Generally, telemetry data is not user data (i.e. data stored intentionally as part of a user's operation of a storage device). As such, the telemetry data generally does not change after creation. However and as will be discussed in greater detail below, to utilize the telemetry data (e.g., for monitoring the performance and/or operation of the cloud computing environment or of the virtual storage appliance), the telemetry data is moved outside of the cloud computing environment/virtual storage appliance for remote analysis.

In some implementations, transferring 300 telemetry data from the virtual storage appliance to the cloud-based object storage device includes generating 306 a configuration file including access information associated with the cloud-based object storage device. For example, suppose that VSA 402 is a PowerStore™ VSA and is deployed within cloud computing environment 400 as a set of instances. In this example, suppose that VSA 402 is deployed as a set of instances on Amazon Elastic Compute Cloud (Amazon EC2) and, by default, uses an Amazon Elastic Block Storage (EBS) volume (e.g., block storage device 404) for system root volumes and user volumes after the system is initialized. In some implementations, telemetry data management process 10 may use a cloud-based object storage device (e.g., object storage device 406) to store telemetry data generated by VSA 402. In one example, object storage device 406 is an Amazon S3 storage device. In some implementations, telemetry data management process 10 prepares object storage device 406 for receiving telemetry data by generating 306 a configuration file (e.g., configuration file 408) with access information associated with the cloud-based object storage device. In the example of an Amazon S3 storage device, telemetry data management process 10 may generate 306 configuration file 408 with an S3 storage device name and an access key.

In some implementations, transferring 300 telemetry data from the virtual storage appliance to the cloud-based object storage device includes installing an open-source plugin (e.g., Amazon S3FS) during the VSA (e.g., PowerStore VSA) deployment and enabling an S3FS cache to tackle latency issues as the Amazon S3 storage device does not permit modification of the new object. In some implementations, the cache allows VSA 402 to frequently write a file on local storage and upload the file as a whole to the S3 storage device after the local write is complete. In some implementations, telemetry data management process 10 generates a directory under a root volume as a mount point to the S3 storage device during VSA boot and mounts the new directory to the S3 storage device according to the configuration file (e.g., configuration file 408).

In some implementations, transferring 300 telemetry data from the virtual storage appliance to the cloud-based object storage device includes writing new telemetry data to the new directory (e.g., object storage device 406) whenever the telemetry data is generated. Accordingly, telemetry data management process 10 iteratively transfers 300 telemetry data (e.g., telemetry data) upon generation from VSA 402 to object storage device 406. In this manner, telemetry data management process 10 avoids the storage inefficiencies of using block storage device 404 for the storage of telemetry data 408. For example, cloud-based block storage devices (e.g., block storage device 404) are considerably more expensive to provision from a cloud service provider than a cloud-based object storage device (e.g., object storage device 406). As such, by transferring 300 telemetry data from VSA 402 or from being stored in block storage device 404 to object storage device 406, the telemetry data cannot be stored and accessed by a remote secure monitoring system more efficiently.

In some implementations, telemetry data management process 10 provides 302 storage location information associated with the telemetry data within the cloud-based object storage device to a remote secure monitoring system. A remote secure monitoring system generally includes a secure, two-way connection between a storage system (e.g., VSA deployed within a cloud computing environment) and a customer support service that helps users avoid and resolve issues. In one example, the remote secure monitoring system (e.g., remote secure monitoring system 412) is Dell EMC's Secure Remote Services, which is a secure, two-way connection between Dell EMC products, and Dell EMC Customer Support that helps customers avoid and resolve issues. Secure Remote Services enables proactive wellness monitoring and issue prevention; automated issue detection, notification and resolution for quicker uptime; and predictive analytics-based recommendations. While the example of Secure Remote Services has been provided, it will be appreciated that this is for example purposes only and that any remote secure monitoring system may be used within the scope of the present disclosure.

In some implementations, providing 302 the storage location information associated with the telemetry data within the cloud-based object storage device to the remote secure monitoring system includes registering 308 the cloud-based object storage device for communicating with the remote secure monitoring system. For example, conventional approaches to providing telemetry data from a cloud computing environment generated by a VSA include using a predefined API (e.g., Representational state transfer (REST) PUT) of Managed File Transfer (MFT) to transfer telemetry data from the VSA to a remote secure monitoring system. In order to have a secure and dynamic transfer from the object storage device, telemetry data management process 10 registers 308 the cloud-based object storage device by generating a configuration file that includes storage location information (e.g., the object storage device name and an access key to the object storage device) for accessing telemetry data within the cloud-based object storage device. In this example, with this storage location information (e.g., storage location information 414), remote secure monitoring system 412 is able to access telemetry data 410 from object storage device 406. In some implementations, storage location information 414 associated with telemetry data 410 within object storage device 406 may be a configuration file. For example, storage location information may include an address or other link for remote secure monitoring system 412 to access telemetry data 410 within object storage device 406. In this manner, remote secure monitoring system 412 may obtain telemetry data 410 within object storage device 406 using storage location information 414.

In some implementations, telemetry data management process 10 provides 304 the telemetry data from the cloud-based object storage device to the remote secure monitoring system. For example, remote secure monitoring system 412 may be configured to request or respond to notifications of new telemetry data. In one example, remote secure monitoring system 412 may periodically poll object storage device 406 for any telemetry data. In another example, telemetry data management process 10 may process a notification to initiate a request (e.g., request 416) for telemetry data. In some implementations, telemetry data management process 10 may use the storage location information (e.g., storage location information 414) to obtain telemetry data 410 from object storage device 406.

In some implementations, providing 304 the telemetry data from the cloud-based object storage device to the remote secure monitoring system includes: providing 310 a notification to the remote secure monitoring system when telemetry data is transferred to the cloud-based object storage device; processing 312 the storage location information associated with the telemetry data to access the telemetry data stored in the cloud-based object storage device; and downloading 314 the telemetry data from the cloud-based object storage device. For example, telemetry data management process 10 may transfer 300 telemetry data 410 from VSA 402 to object storage device 406 as the telemetry data is generated. In response to transferring telemetry data 410, telemetry data management process 10 may generate and provide a notification (e.g., notification 418) to remote secure monitoring system 412 indicating that telemetry data 410 has been transferred to object storage device 406. In some implementations, notification 418 may include additional storage location information associated with the telemetry data. In this manner, remote secure monitoring system 412 may process initial storage location information 414 to obtain permission to access object storage device 406 and may process subsequent storage location information to access particular telemetry data. In another example, notification 418 may indicate the availability of telemetry data 410 generally and remote secure monitoring system 412 may use storage location information 414 to obtain the telemetry data. As such, it will be appreciated that storage location information 414 and notification 418 may include access information generally or for specific portions of telemetry data.

In response to receiving a notification (e.g., notification 418), remote secure monitoring system 412 may provide a request (e.g., request 416) for telemetry data 410. Accordingly, telemetry data management process 10 may process 312 the storage location information associated with the telemetry data to access the telemetry data stored in the cloud-based object storage device. For example, request 416 may include storage location information 414 associated with telemetry data 410 to access telemetry data 410 from object storage device 406. In some implementations, telemetry data management process 10 may telemetry data management process 10 the storage location information associated with the telemetry data and provide telemetry data 410 from object storage device 406 by downloading 314 telemetry data 410 to remote secure monitoring system 412.

In some implementations, downloading 314 the telemetry data from the cloud-based object storage device may include downloading 316 the telemetry data from the cloud-based object storage device using Managed File Transfer (MFT). MFT refers to a technology that provides the secure transfer of data in an efficient and reliable manner. MFT software is provides a more secure alternative to using insecure protocols like File Transfer Protocol (FTP) and HTTP to transfer files. By using MFT, users can avoid custom scripting and meet compliance requirements. In some implementations, telemetry data management process 10 uses MFT to download 316 telemetry data 410 from object storage device 406 in order to provide secure access to object storage device 406. In some implementations, telemetry data management process 10 may use a predefined API in conjunction with MFT to download 316 the telemetry data. For example, request 416 may include a REST GET call for telemetry data 410 from object storage device 406.

In some implementations, telemetry data management process 10 provides 318 the telemetry data from the remote secure monitoring system to a data analysis system. A data analysis system (e.g., data analysis system 420) may generally include any system (hardware and/or software) configured to process telemetry data and/or other related data from the remote secure monitoring system (e.g., remote secure monitoring system 412). In some implementations, data analysis system 420 may be accessed by a storage system administrator or user to assess any issues associated with the operation of the storage system (e.g., VSA deployed within the cloud computing environment). In some implementations, data analysis system 420 may poll or request telemetry data from remote secure monitoring system 412 periodically and/or when requested by a user of data analysis system 420. In some implementations, data analysis system 420 may obtain telemetry data in response to a notification from remote secure monitoring system 412. For example, remote secure monitoring system 412 may generate a notification (e.g., notification 422) when telemetry data is downloaded and available for processing by data analysis system 420.

In some implementations, telemetry data management process 10 may generate the notification in response to downloading a threshold amount of telemetry data. The threshold may be user-defined or defined automatically by telemetry data management process 10. For example, telemetry data management process 10 may dynamically adjust the threshold based on storage capacity, age of the telemetry data, a number of alerts or recommendations generated for particular telemetry data, etc. In some implementations, data analysis system 420 may, in response to receiving notification 422, send a request (e.g., request 424) for the telemetry data, alerts and/or recommendations associated with the telemetry data. In some implementations, request 424 may be a predefined API. In one example, request 424 may be a HTTP GET call or command configured to retrieve the telemetry data from remote secure monitoring system 412.

As discussed above, telemetry data management process 10 may facilitate a file transfer to a remote secure monitoring system in two phases: VSA to object storage and object storage to the remote secure monitoring system. Since the movement from VSA to object storage is internal to the cloud computing environment, this transfer does not introduce extra traffic cost when configured with appropriate endpoints within a region. The data movement from object storage to the remote secure monitoring system generally has lower cost compared with transferring directly from the VSA from an IO processing cost and bandwidth point of view. Accordingly, telemetry data management process 10 provides an enhanced process for efficiently storing and transferring telemetry data. Additionally, downloading telemetry data using object storage devices is much faster from a bandwidth perspective.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc. Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    transferring telemetry data from a virtual storage appliance deployed within a cloud computing environment to a cloud-based object storage device within the cloud computing environment;
    providing storage location information associated with the telemetry data within the cloud-based object storage device to a remote secure monitoring system;
    providing the telemetry data from the cloud-based object storage device to the remote secure monitoring system that is physically separate from the cloud-based object storage device; and
    providing the telemetry data from the remote secure monitoring system to a data analysis system in response to a notification generated from the remote secure monitoring system when a threshold amount of the telemetry data is downloaded and available for processing by the data analysis system, wherein the threshold is dynamically adjusted based on at least one or more of storage capacity, age of the telemetry data, and a number of alerts or recommendations generated for particular telemetry data.

2. The computer-implemented method of claim 1, wherein the telemetry data includes at least one of:
one or more log files; and
one or more archive files.

3. The computer-implemented method of claim 1, wherein transferring telemetry data from the virtual storage appliance to the cloud-based object storage device includes generating a configuration file including access information associated with the cloud-based object storage device.

4. The computer-implemented method of claim 1, wherein providing the storage location information associated with the telemetry data within the cloud-based object storage device to the remote secure monitoring system includes registering the cloud-based object storage device for communicating with the remote secure monitoring system.

5. The computer-implemented method of claim 1, wherein providing the telemetry data from the cloud-based object storage device to the remote secure monitoring system includes:
providing a notification to the remote secure monitoring system when telemetry data is transferred to the cloud-based object storage device;
processing the storage location information associated with the telemetry data to access the telemetry data stored in the cloud-based object storage device; and
downloading the telemetry data from the cloud-based object storage device.

6. The computer-implemented method of claim 5, wherein downloading the telemetry data from the cloud-based object storage device includes downloading the telemetry data from the cloud-based object storage device using Managed File Transfer (MFT).

7. A computer program product residing on a non-transitory computer readable medium having a plurality of instructions stored thereon which, when executed by a processor, cause the processor to perform operations comprising:
transferring telemetry data from a virtual storage appliance deployed within a cloud computing environment to a cloud-based object storage device within the cloud computing environment;
providing storage location information associated with the telemetry data within the cloud-based object storage device to a remote secure monitoring system;
providing the telemetry data from the cloud-based object storage device to the remote secure monitoring system that is physically separate from the cloud-based object storage device; and
providing the telemetry data from the remote secure monitoring system to a data analysis system in response to a notification generated from the remote secure monitoring system when a threshold amount of the telemetry data is downloaded and available for processing by the data analysis system, wherein the threshold is dynamically adjusted based on at least one or more of storage capacity, age of the telemetry data, and a number of alerts or recommendations generated for particular telemetry data.

8. The computer program product of claim 7, wherein the telemetry data includes at least one of:
one or more log files; and
one or more archive files.

9. The computer program product of claim 7, wherein transferring telemetry data from the virtual storage appliance to the cloud-based object storage device includes generating a configuration file including access information associated with the cloud-based object storage device.

10. The computer program product of claim 7, wherein providing the storage location information associated with the telemetry data within the cloud-based object storage device to the remote secure monitoring system includes:
registering the cloud-based object storage device for communicating with the remote secure monitoring system.

11. The computer program product of claim 7, wherein providing the telemetry data from the cloud-based object storage device to the remote secure monitoring system includes:
providing a notification to the remote secure monitoring system when telemetry data is transferred to the cloud-based object storage device;
processing the storage location information associated with the telemetry data to access the telemetry data stored in the cloud-based object storage device; and
downloading the telemetry data from the cloud-based object storage device.

12. The computer program product of claim 11, wherein downloading the telemetry data from the cloud-based object storage device includes downloading the telemetry data from the cloud-based object storage device using Managed File Transfer (MFT).

13. A computing system comprising:
a memory; and
a processor configured to transfer telemetry data from a virtual storage appliance deployed within a cloud computing environment to a cloud-based object storage device within the cloud computing environment, wherein the processor is further configured to provide storage location information associated with the telemetry data within the cloud-based object storage device to a remote secure monitoring system, wherein the processor is further configured to provide the telemetry data from the cloud-based object storage device to the remote secure monitoring system that is physically separate from the cloud-based object storage device, wherein the processor is further configured to provide the telemetry data from the remote secure monitoring system to a data analysis system in response to a notification generated from the remote secure monitoring system when a threshold amount of the telemetry data is downloaded and available for processing by the data analysis system, and wherein the threshold is dynamically adjusted based on at least one or more of storage capacity, age of the telemetry data, and a number of alerts or recommendations generated for particular telemetry data.

14. The computing system of claim 13, wherein the telemetry data includes at least one of:
one or more log files; and
one or more archive files.

15. The computing system of claim 13, wherein transferring telemetry data from the virtual storage appliance to the cloud-based object storage device includes generating a configuration file including access information associated with the cloud-based object storage device.

16. The computing system of claim 13, wherein providing the storage location information associated with the telemetry data within the cloud-based object storage device to the remote secure monitoring system includes:
registering the cloud-based object storage device for communicating with the remote secure monitoring system.

17. The computing system of claim 13, wherein providing the telemetry data from the cloud-based object storage device to the remote secure monitoring system includes:
- providing a notification to the remote secure monitoring system when telemetry data is transferred to the cloud-based object storage device;
- processing the storage location information associated with the telemetry data to access the telemetry data stored in the cloud-based object storage device; and
- downloading the telemetry data from the cloud-based object storage device.

18. The computing system of claim 17, wherein downloading the telemetry data from the cloud-based object storage device includes downloading the telemetry data from the cloud-based object storage device using Managed File Transfer (MFT).

* * * * *